(12) United States Patent
Burwell

(10) Patent No.: US 6,517,719 B1
(45) Date of Patent: Feb. 11, 2003

(54) OIL AND WATER SEPARATOR

(75) Inventor: John Burwell, Eagan, MN (US)

(73) Assignee: Xerxes Corporation, Minneapolis, MN (US)

( * ) Notice: Subject to any disclaimer, the term of this patent is extended or adjusted under 35 U.S.C. 154(b) by 38 days.

(21) Appl. No.: 09/722,559

(22) Filed: Nov. 28, 2000

(51) Int. Cl.⁷ ............................................. C02F 1/28
(52) U.S. Cl. ................ 210/257.1; 210/305; 210/314; 210/320; 210/336; 210/323.2; 210/DIG. 5
(58) Field of Search ................................. 210/799, 284, 210/305, 314, 320, 336, 257.1, 323.2, DIG. 5

(56) References Cited

U.S. PATENT DOCUMENTS

| | | | | |
|---|---|---|---|---|
| 2,872,043 A | * | 2/1959 | Fitzgerald et al. | 210/499 |
| 3,034,656 A | * | 5/1962 | Kasten | 210/492 |
| 3,214,368 A | * | 10/1965 | Muller | 210/136 |
| 3,256,997 A | * | 6/1966 | Pall et al. | 208/187 |
| 4,308,136 A | * | 12/1981 | Warne, Jr. | 210/114 |
| 4,333,835 A | | 6/1982 | Lynch | 210/305 |
| 4,425,239 A | * | 1/1984 | Jacocks et al. | 210/521 |
| 4,892,667 A | * | 1/1990 | Parker et al. | 210/241 |
| 5,296,150 A | | 3/1994 | Taylor, Jr. | 210/708 |
| 5,443,724 A | * | 8/1995 | Williamson et al. | 210/295 |
| 5,928,524 A | | 7/1999 | Casola | 210/802 |
| 5,965,015 A | | 10/1999 | Ronan et al. | 210/87 |

* cited by examiner

Primary Examiner—Peter A. Hruskoci
(74) Attorney, Agent, or Firm—Piper Rudnick LLP; Steven B. Kelber

(57) ABSTRACT

A storage tank includes an oil and water separator in which the frontal area of the coalescers is increased relative to known arrangements of coalescers in oil and water separators. By arranging the coalescers such that the surface area of the coalescers is increased, the efficiency of the coalescers is increased. In some preferred embodiments, the coalescers are arranged in a bank with free flow fluid paths between the coalescers in the bank, each of the paths being closed by a baffle on one end and open on an opposite end, and the baffles are arranged such that the open and closed ends of paths alternate. In other preferred embodiments, the coalescers are arranged in a tubular fashion and fluid flows from the outside surface of the tube through the coalescers and out a central path.

11 Claims, 10 Drawing Sheets

OIL AND WATER SEPARATOR

BACKGROUND OF THE INVENTION

1. Field of the Invention

The present invention relates to oil and water separators generally and more particularly to oil and water separators employing coalescers.

2. Discussion of the Background

Concerns over possible contamination of the water supply through the presence of oil and other contaminants in wastewater has risen dramatically in recent years. Many governmental authorities require such contaminants to be removed before the wastewater may be discharged into the environment. The level of contamination permitted by government regulation varies. Typically, oil in such wastewater should be less than 25 parts per million, and preferably 5–10 parts per million or less.

Oil/water separating systems are the preferred method of treating oil-contaminated wastewater. An example of such a gravity oil/water separator is described in U.S. Pat. No. 5,204,000 to Steadman, et al. One known type of oil/water separator is the gravity oil/water separator. The gravity separators function by allowing gravity to separate the oil from the water. A serious problem associated with gravity separators is that they require a large volume and/or long processing times to accomplish the separation. This makes such separators costly and impractical for many applications.

The aforementioned problems associated with gravity separators has led many to incorporate coalescers into oil and water separators. One well-known type coalescer is formed from oleophilic and/or hydrophobic materials for attracting oil and/or repelling water as oil-contaminated water passes through the coalescer. An example of coalescers of this type are the vertical tube coalescers available from AFL Industries, Inc. These coalescers are described in U.S. Pat. No. 4,333,835 to Lynch. Such coalescers have been used by Xerxes Corp., the assignee of the present invention, in underground wastewater storage tanks. Tanks such as these have generally been designed under the assumption that the oil separation gradient is linear; that is, that the amount of oil in wastewater decreases linearly as the wastewater passes through the coalescers. Thus, the coalescers have generally been arranged in a single continuous block. While tanks with such arrangements of coalescers have proven effective in removing oil from wastewater in smaller areas and/or more quickly than gravity separators, these tanks are expensive.

What is needed is a more economical oil and water separator.

SUMMARY OF THE INVENTION

The present invention meets the above-identified need to a great extent by providing a storage tank with an oil and water separator in which the frontal area of the coalescers is increased relative to known arrangements of coalescers in oil and water separators. It has been discovered through experimentation that the oil separation gradient is not linear, but rather exponential. That is, the vast majority of the oil/water separation occurs at the first portion of the coalescer that is exposed to wastewater, and oil removal decreases in efficiency as wastewater moves through the coalescer. Therefore, by arranging the coalescers such that the frontal surface area of the coalescers is increased, the efficiency of the coalescers is increased. In some preferred embodiments, the coalescers are arranged in a bank with free flow fluid paths between the coalescers in the bank, each of the paths being closed by a baffle on one end and open on an opposite end, and the baffles are arranged such that the open and closed ends of paths alternate. In other preferred embodiments, the coalescers are arranged in a tubular fashion and fluid flows from the outside surface of the tube through the coalescers and out a central path.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1*a* is a perspective view of a known underground wastewater storage tank.

FIG. 1*b* is a cross sectional plan view of the tank of FIG. 1 taken along the line IB—IB of FIG. 1*a*.

FIGS. 2*a–c* are cross sectional views of the tank of FIG. 1 taken along the lines IIA—IIA, IIB—IIB and IIC—IIC of FIG. 1*b*.

FIGS. 3*a–b* are a cross-sectional views of a second known underground wastewater storage tank.

FIG. 4 is a cross-sectional plan view of a storage tank according to a first embodiment of the present invention.

FIGS. 5*a–c* are cross sectional views taken along the lines VA—VA, VB—VB and VC—VC, respectively, of the tank of FIG. 4.

FIG. 6 is a cross sectional plan view of a storage tank according to a second embodiment of the present invention.

FIG. 7 is a cross sectional plan view of a storage tank according to a third embodiment of the present invention.

FIGS. 8*a–c* are cross sectional views taken along the lines VIIIA—VIIIA, VIIIB—VIIIB and VIIIC—VIIIC, respectively, of the tank of FIG. 7.

FIG. 9 is a cross sectional view of a tank according to a fourth embodiment of the present invention.

FIG. 10 is a graph of oil removal as a function of distance from the front surface in a typical coalescer.

DESCRIPTION OF THE PREFERRED EMBODIMENTS

The present invention will be discussed with reference to preferred embodiments of storage tanks including coalescers. Specific details, such as the arrangements and numbers of coalescers, are set forth in order to provide a thorough understanding of the present invention. The preferred embodiments discussed herein should not be understood to limit the invention.

Referring now to the drawings, wherein like reference numerals designate identical or corresponding parts throughout the several views, FIG. 1*a* illustrates a perspective view of a known arrangement of coalescers in an underground wastewater storage tank 100 as discussed above. The tank 100 may be comprised of any material, including but not limited to steel or plastic (preferably fiber reinforced plastic, referred to herein as fiberglass).

A top cross sectional view of the tank 100 is shown in FIG. 1*b*. The tank 100 includes a coalescer 130. The coalescer 130 may comprise a single coalescer or may comprise several coalescers placed side to side (coalescers are sometimes manufactured in 1 foot by 1 foot sections of varying length and can be trimmed to size as necessary). Baffles 110 and 120 direct the flow of wastewater through the coalescer 130. As seen more clearly in FIGS. 2a–c, the baffles 110, 120 block the entire tank save for an opening O, which is formed on opposite sides of the baffles 110, 120. This arrangement causes wastewater to flow in an "S" like fashion as indicated by the flow path F shown in FIG. 1b. This configuration is currently used in 8 foot and 10 foot diameter fiberglass storage tanks manufactured by the Xerxes Corporation.

Figure 1A:
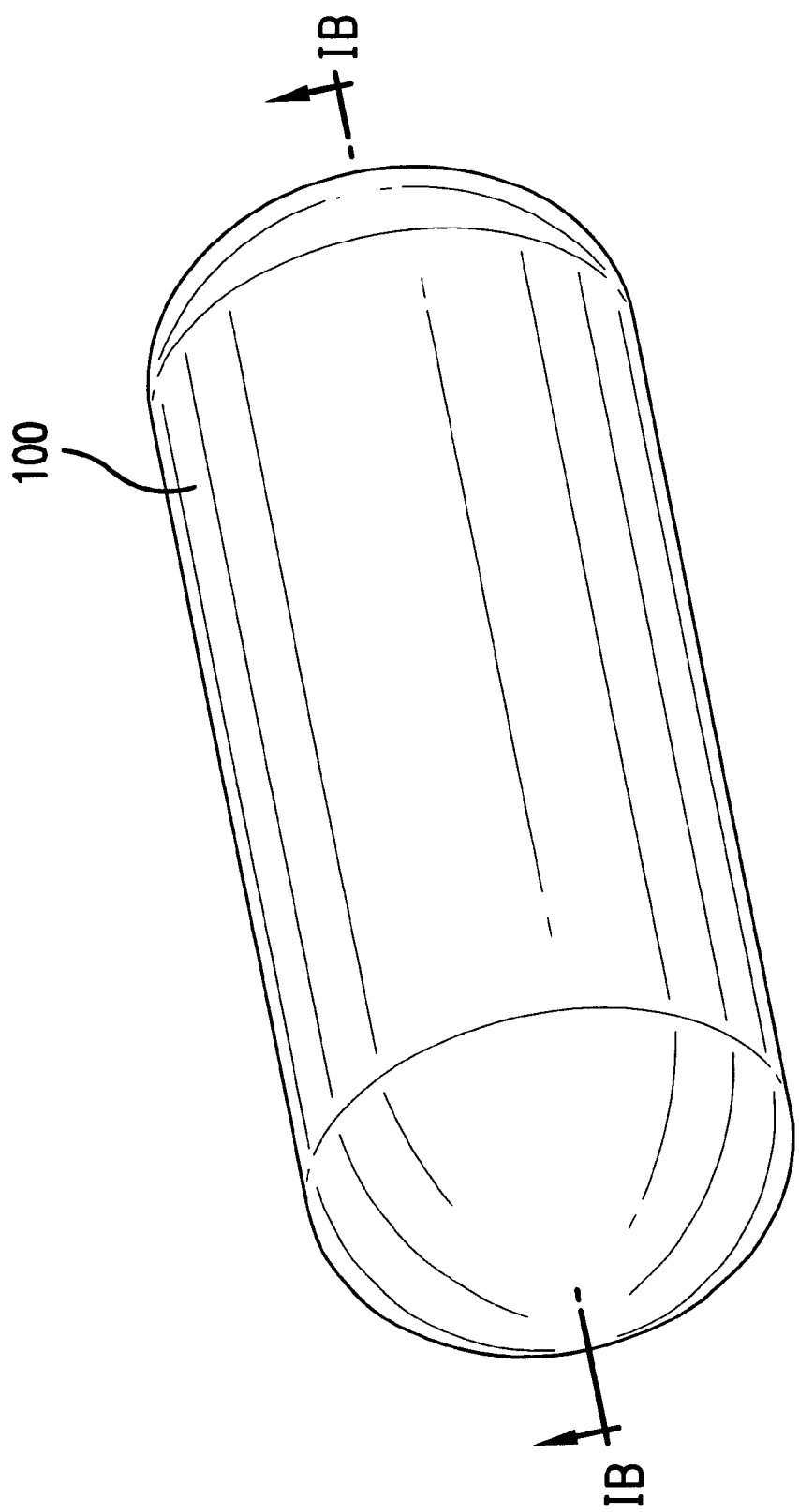
Figure 1B:
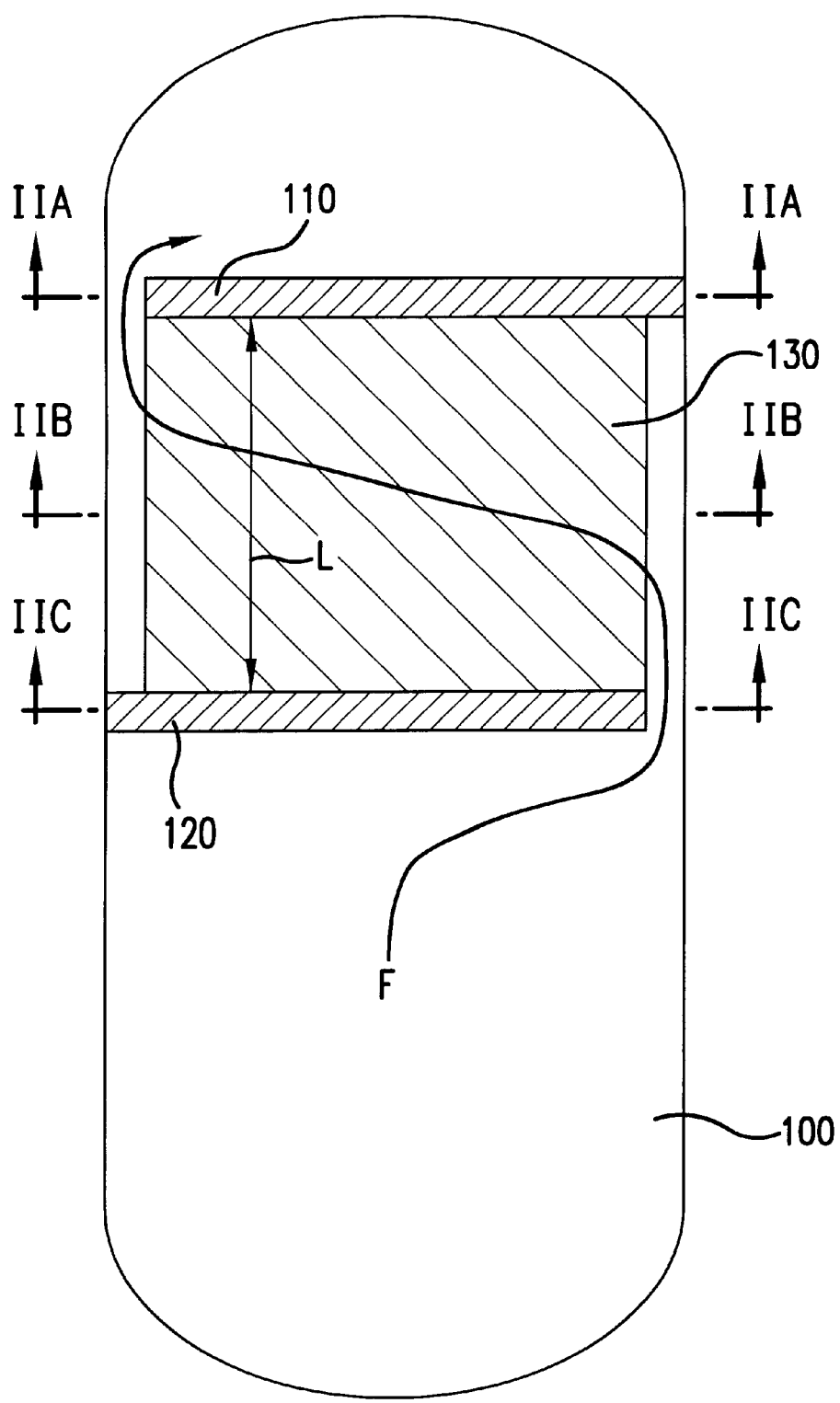
Figure 2A:
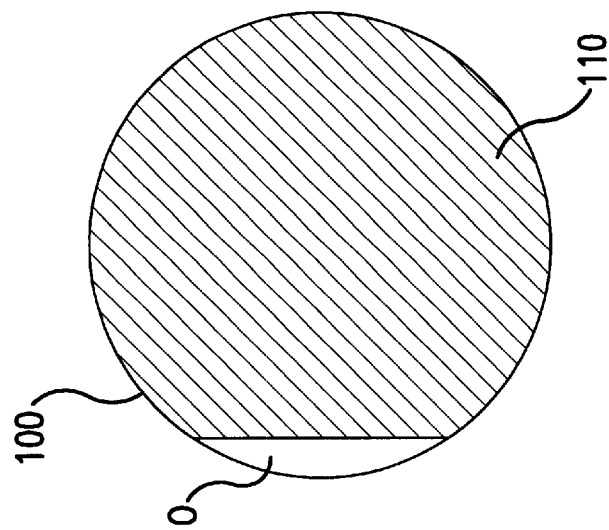
Figure 2B:
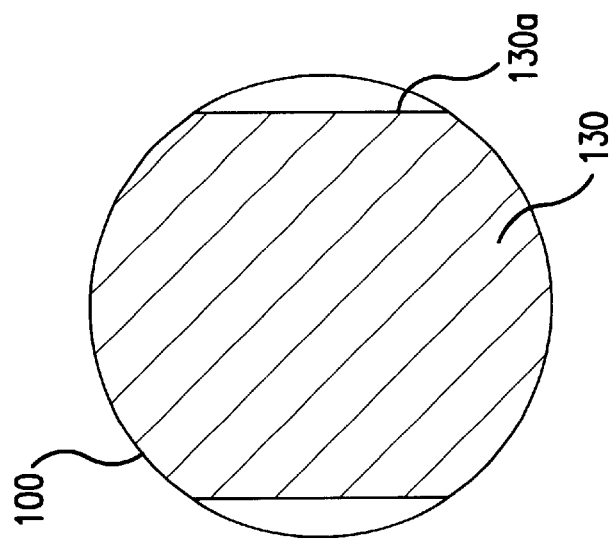
Figure 2C:
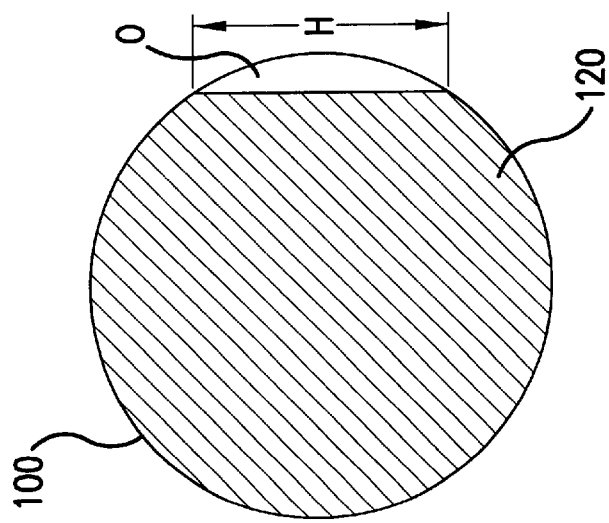

The frontal surface area (the area of the coalescer surface exposed to wastewater flow) of the coalescer 130 is found by multiplying the length L (FIG. 1(b)) of the coalescer 130 by the height H (FIG. 2(a)) of the opening O of the baffle 120. This arrangement results in a relatively small frontal area.

Figure 3A:
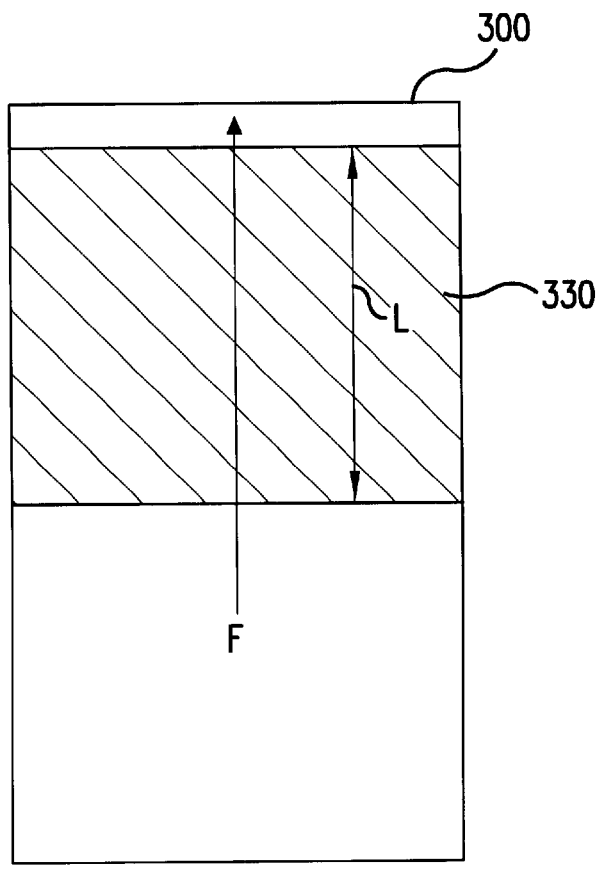
Figure 3B:
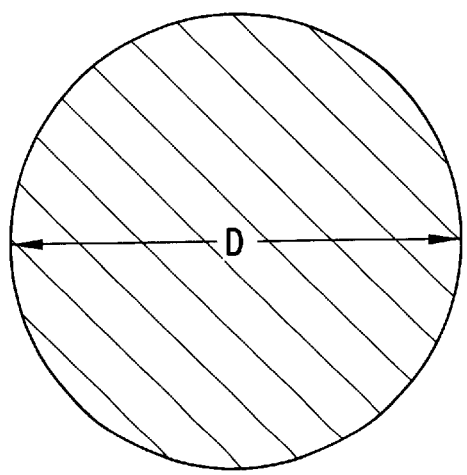

FIG. 3 represents a second known arrangement of coalescers in an underground storage tank 300. The coalescer 330 in cylindrical in shape and has a diameter D equal to the inside diameter of the tank 300. No baffles are used in the tank 300. Wastewater simply flows through the coalescer 330 from one end of the tank 300 to the other. This arrangement is used in 4 foot and 6 foot diameter tanks manufactured by Xerxes Corp.

The frontal area of the coalescer 330 is equal to $\pi*(D/2)^2$. While this arrangement results in a relatively larger frontal area as compared to the tank 100, it is still less than optimal.

Figure 10:
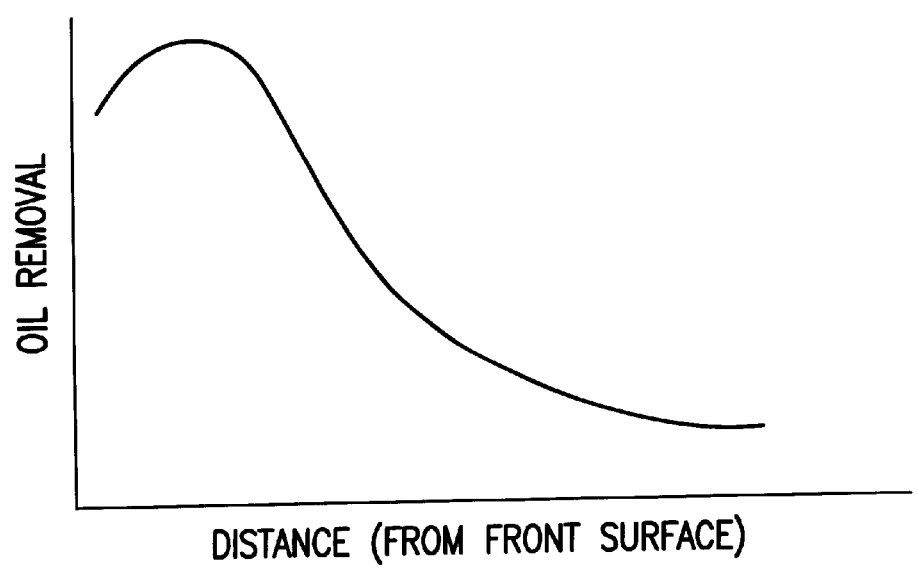

As discussed above, it has been discovered that oil/water separation decreases exponentially as a function of distance from the surface to which the wastewater is first exposed. FIG. 10 is a graph of the amount of oil/water separation that occurs in a typical coalescer as a function of distance from the front surface (the surface that is first exposed to the wastewater). It is clear from FIG. 10 that the vast majority of the oil/water separation occurs in the first portion of the coalescer where the wastewater first comes into contact with the coalescers. Accordingly, if the frontal area of the coalescer can be increased, the efficiency of the coalescer will likewise be increased.

Figure 4:
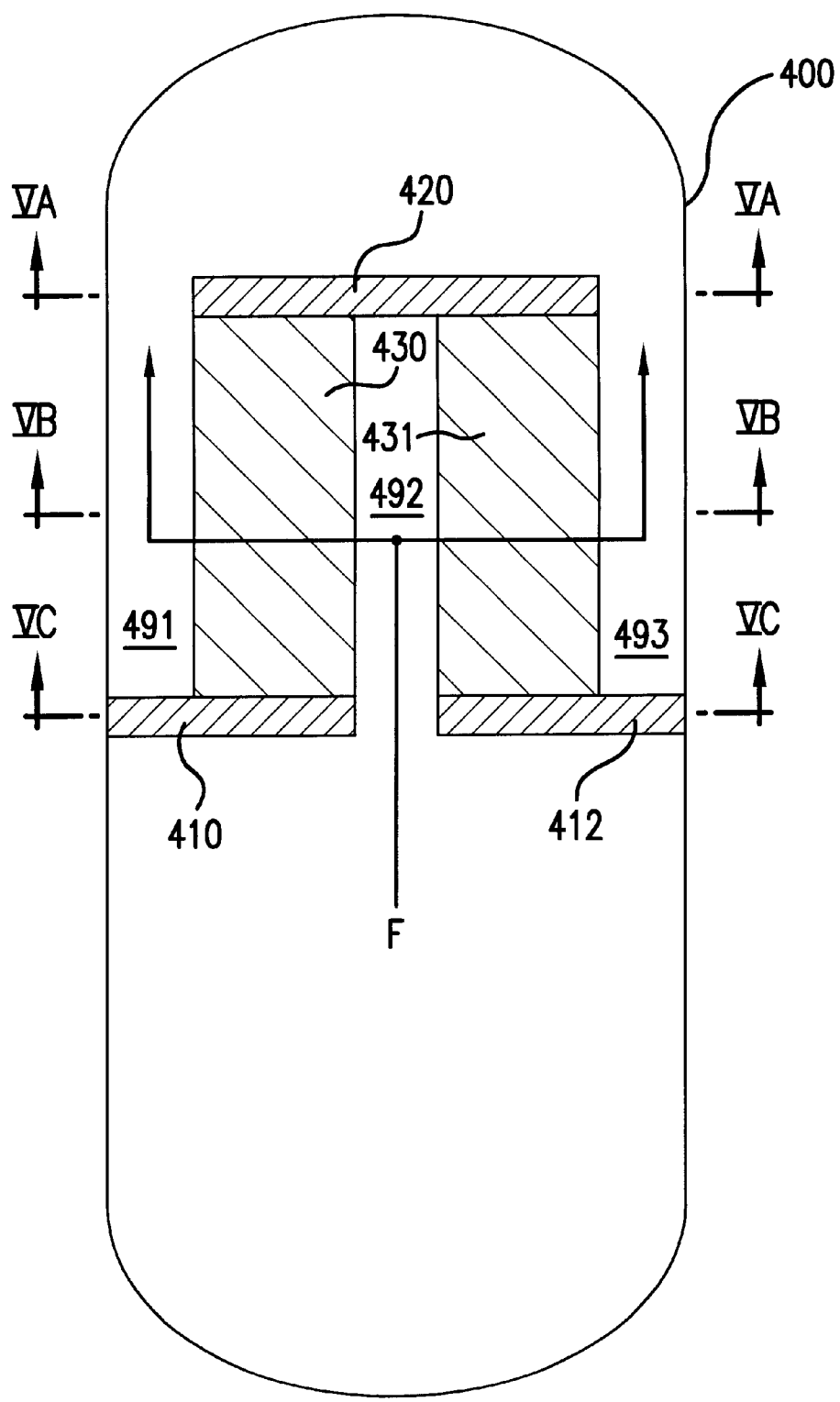

A tank 400 with an improved arrangement of coalescers 430, 431 resulting in an increased frontal area is shown in FIGS. 4 and 5a–c. Referring now to FIG. 4, it can be seen that, rather than providing a single coalescer, two coalescers 430, 431 have been provided. Free flow paths 491–493 are provided on either side of the coalescers 430, 431. Baffles 410, 412 (FIG. 5(c)) direct the wastewater flow F through the central path 492. Baffle 420 (FIG. 5(a)) then forces the flow through the coalescers 430, 431 and side paths 491, 493. It will be readily apparent that the locations of the baffles 410, 412 and 420 could also be reversed such that wastewater would flow from paths 491 and 493, through coalescers 430, 431 and out the central path 492.

Figure 5C:
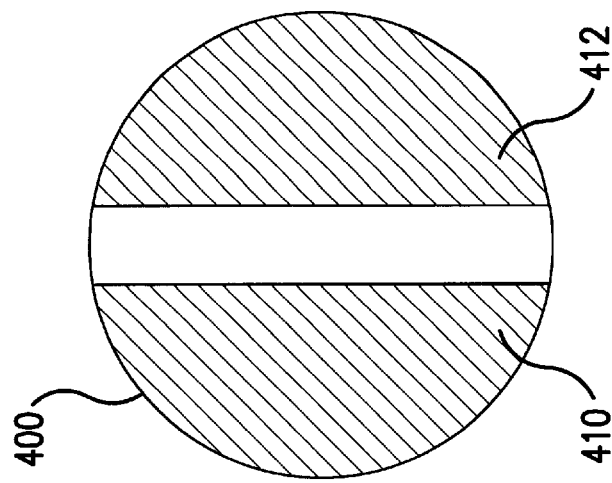
Figure 5B:
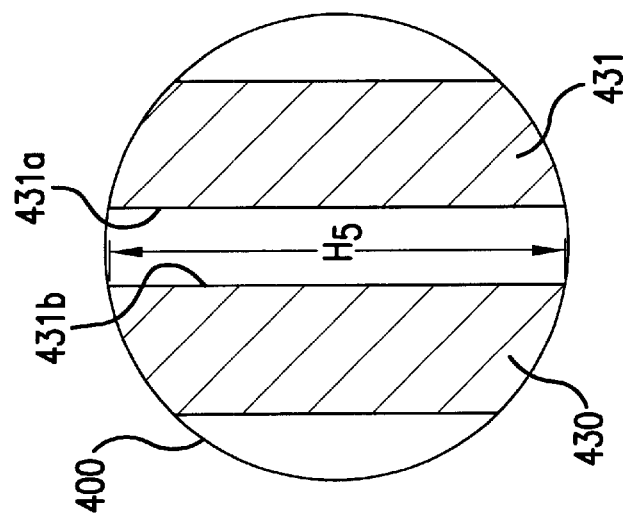
Figure 5A:
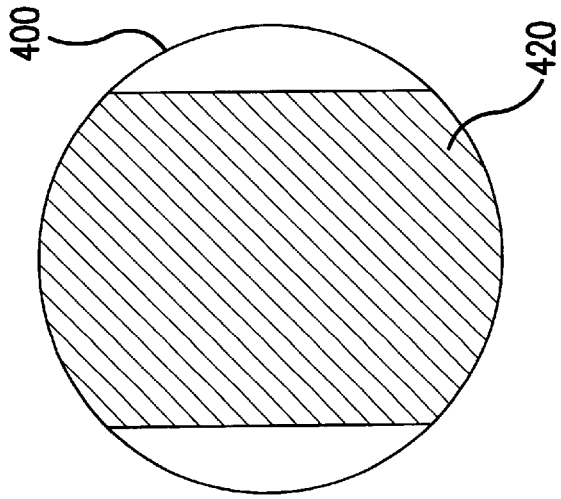

The arrangement illustrated in FIGS. 4 and 5 results in a frontal area that is more than doubled with respect to the frontal area achieved with the arrangement of FIGS. 1(b) and 2. This is readily apparent as the arrangement of FIGS. 4 and 5 results in two coalescer frontal surfaces 431a,b as opposed to the single frontal surface 130a of FIG. 2, while the height $H_5$ of the coalescer frontal surfaces 431a,b is larger than the height H of the frontal surface 130a of FIG. 2. The relative improvement with respect to the arrangement shown in FIG. 3 depends upon the length of the coalescers and the diameter of the tank. For example, a 4 foot diameter tank with a 3 foot long coalescer arranged as shown in FIG. 3 has a frontal area approximately equal to $\pi*(4/2)^2=12.6$ square feet. In contrast, the frontal area of the arrangement shown in FIGS. 4 and 5 is approximately equal to 2*3*(3.5)=21 square feet (assuming that the height $H_5$ (FIG. 5(b)) of the coalescers 430, 431 is approximately equal to 3.5 feet). The improvement in frontal area is approximately 67% for this example.

The increase in efficiency resulting from the above-discussed arrangement can be utilized in different ways. For example, the flow through the coalescer is given by equation (1):

$$Q=A*V \qquad (1)$$

where Q is the flow, A is the frontal area of the coalescer bank, and V is the velocity of the wastewater. Thus, by increasing the frontal area A, the total flow Q is increased. Alternatively, because the majority of the oil/water separation occurs at the frontal area 431a,b of the coalescers 430, 431, and the frontal area of the coalescers 430, 431 is increased in the tank 400, the total volume of the coalescers may be reduced while maintaining the same oil/water separation performance (i.e., the wastewater will just as clean with a smaller volume of coalescers). This allows the cost of the tank system to be reduced significantly.

Figure 6:
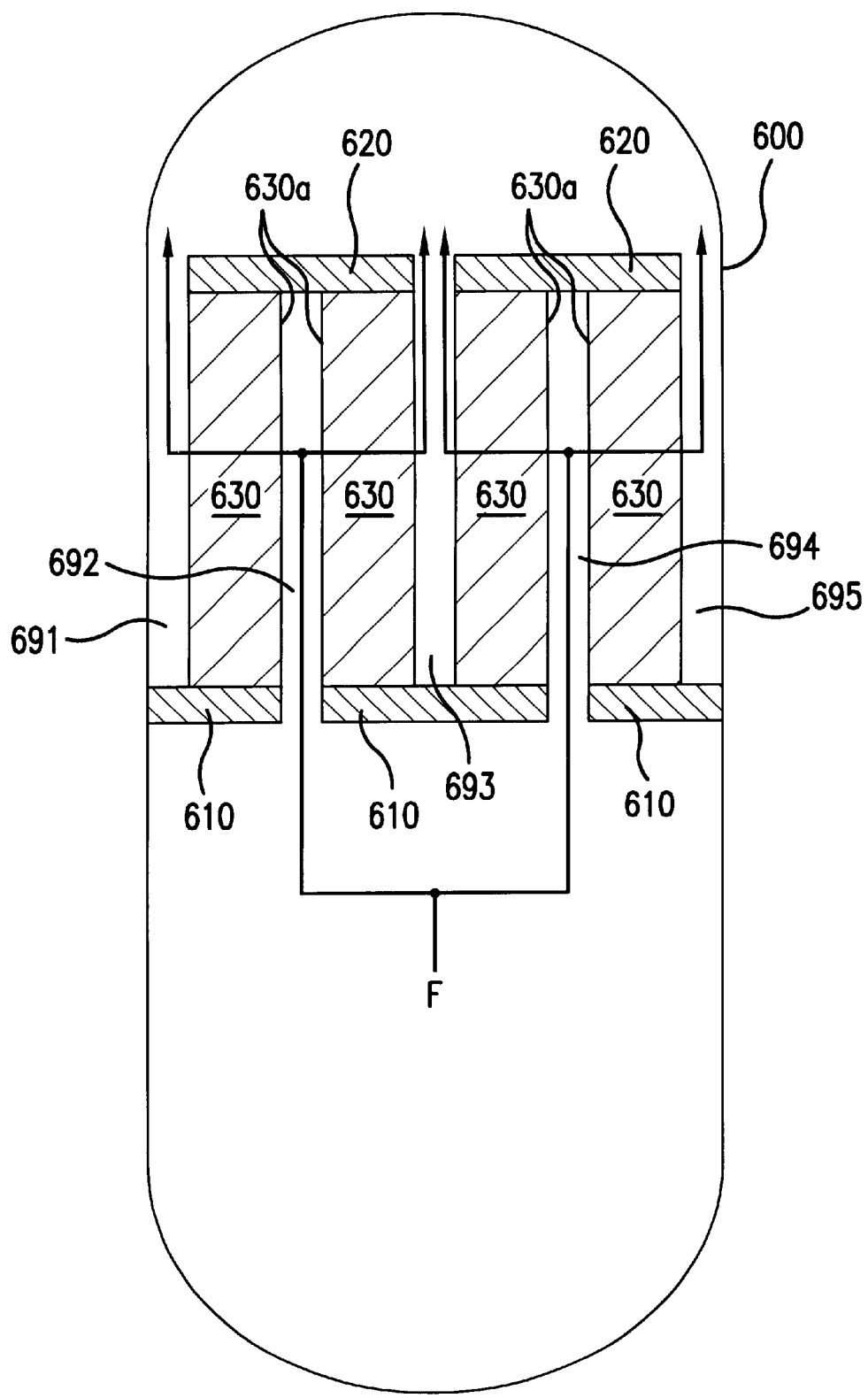
Figure 7:
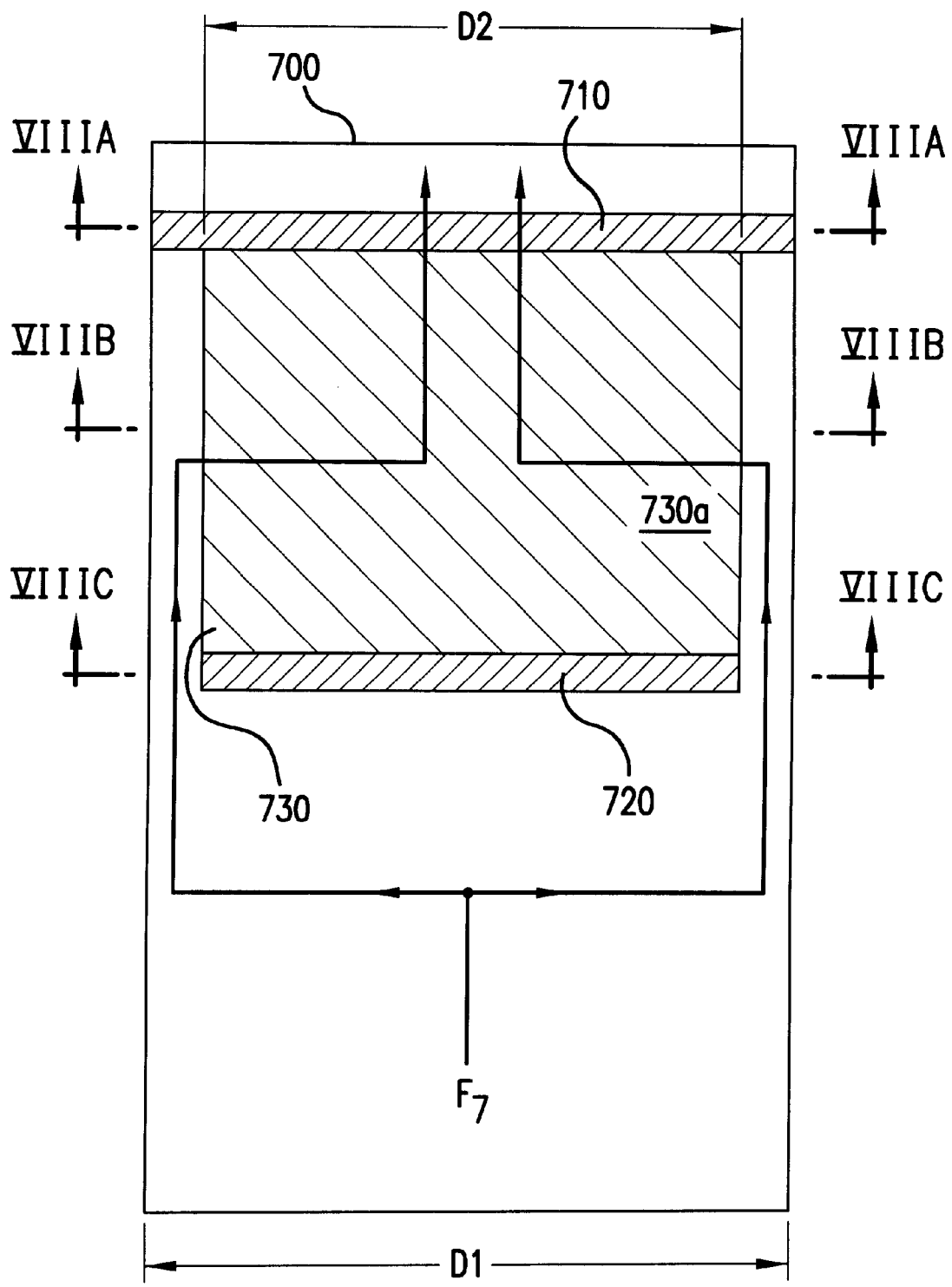

Other embodiments of tanks with increased coalescer frontal area are also possible. For example, the tank 600 of FIGS. 6 and 7 is a variation on the same theme shown in FIGS. 4 and 5. In the tank 600, there are 4 coalescers 630 instead of two. Baffles 610 and 620 are arranged such that flow paths 691–695 are closed on one end and open on another and the orientation of the open and closed ends alternates from path to path. Thus, the baffles 610 provide two entry paths 692, 694 for wastewater to reach one of the four front surfaces 630a, flow through coalescers 630, and out one of three exit paths 691, 693, 695 provided by baffles 620. It will be apparent to those of skill in the art that arrangements comprising greater numbers of coalescers arranged in the same manner are also possible. As discussed above, the vast majority of oil/water separation occurs at the surface where the wastewater first contacts the coalescers. In such embodiments, the thickness of the coalescers, measured in a direction normal to the first surfaces, is preferably between approximately one foot and approximately two feet. Even numbers of coalescers are preferable in such embodiments.

Figure 8C:
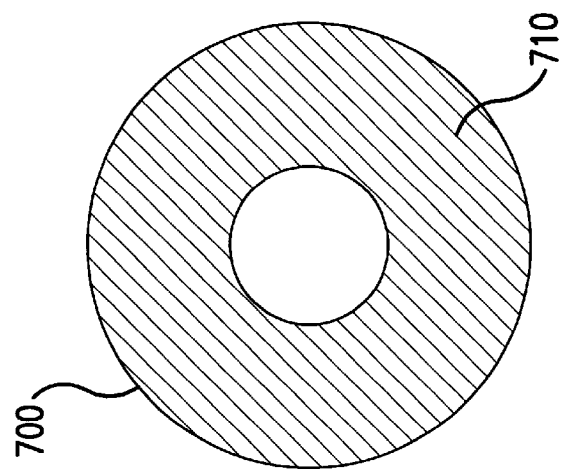
Figure 8B:
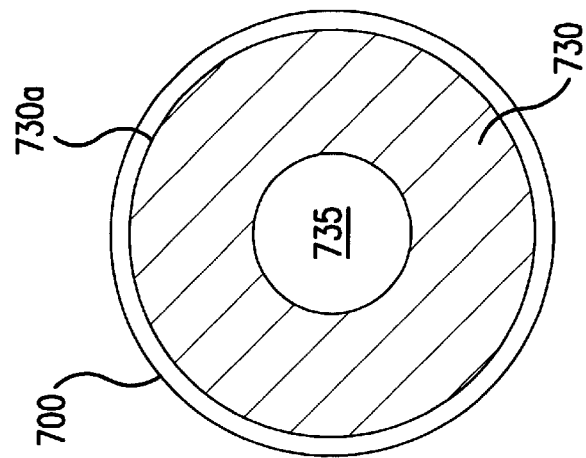
Figure 8A:
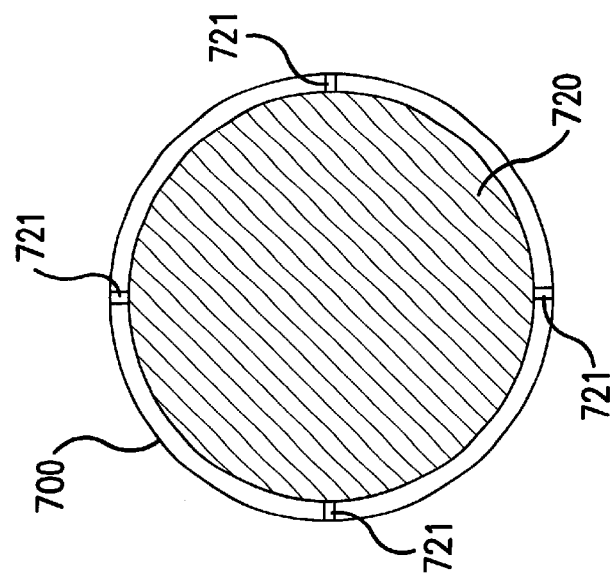

Another arrangement of a coalescer 730 in a tank 700 is illustrated in FIGS. 7 and 8. This embodiment is directed primarily toward tanks that are oriented vertically rather than horizontally. In this embodiment, the coalescer 730 is tubular and has a diameter D2 smaller than the diameter D1 of the tank 700. The baffle 720, which has a diameter sufficient to close the central path 735 of the coalescer 730, directs wastewater to the outside surface 730a of the coalescer 730, through the coalescer 730, and out the central path 735 past baffle 710. In the tank 700, it is preferable that the flow $F_7$ be directed from the outside surface 730a to the central path 735 (rather that a flow in the opposite direction from the central path 735 to the outside surface 730a) as the flow $F_7$ results in an increased coalescer surface area relative to a flow in the opposite direction.

Figure 9:
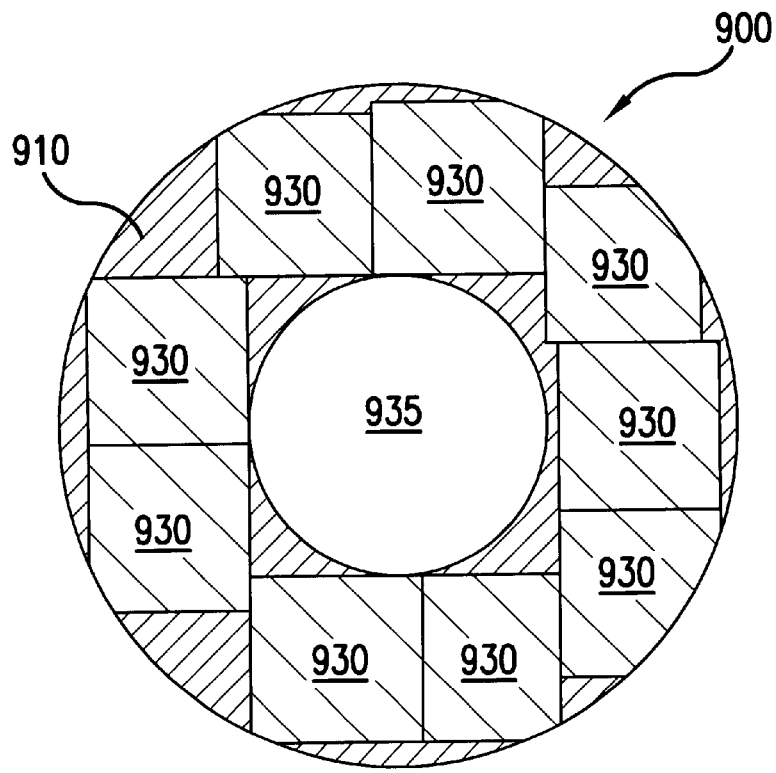

As discussed above, coalescers are sometimes provided in one foot by one foot bundles of varying lengths (each of the sections is comprised of approximately 100 vertical tubes arranged in a 10 tube by 10 tube matrix). The arrangement shown in FIGS. 7 and 8 can be approximated using such coalescers as shown in the tank 900 of FIG. 9. In the tank 900, the coalescers 930 are arranged about a central pathway 935 in a somewhat circular fashion.

The actual construction of any of the above embodiments is straightforward. The tanks themselves may be constructed using fiberglass, steel, or any other suitable material. The tanks may be single or multi-walled. The coalescers may be any suitable type, but are preferably of the vertical tube type available from AFL Industries, Inc. The coalescers may be held in place in the tank by attaching them to each other and the baffles. Alternatively, simple frames may be constructed to keep the coalescers in place. The baffles likewise may be comprised of fiberglass, steel, or any other suitable material that will substantially block the passage of wastewater and may be attached to the inside surface of the tank using conventional methods.

Although the preferred embodiments of the invention have been discussed in the context of underground storage tanks, it is readily apparent that the invention is equally useful in above ground storage tanks as well as in other vessels in which wastewater is stored or transported, including pipes and reservoirs of all many different types. In tank embodiments, the tanks may be single or multiwalled, and in multiwalled variants may include sensors for monitoring an annular space between walls. The tanks may have flat or domed shaped ends (embodiments showing both flat and dome shaped ends have been depicted herein). The cross sectional shape of the wall of the vessel, while circular in the preferred embodiments, can be of any shape (e.g., oval, square, elliptical, etc.), regular or not, that forms an enclosure. It is also possible to employ the invention in mobile wastewater treatment units such as that discussed in U.S. Pat. No. 5,296,150.

Obviously, numerous modifications and variations of the present invention are possible in light of the above teachings. It is therefore to be understood that within the scope of the appended claims, the invention may be practiced otherwise than as specifically described herein.

What is claimed is:

1. A wastewater storage tank comprising:
   a cylindrical wall having a first closed end and a second closed end;
   two coalescers positioned inside the cylindrical wall, each of the coalescers having a proximal end and a distal end, the coalescers being spaced apart to define a central path between the coalescers, each of the coalescers being spaced apart from at least a portion of the wall to form a side path between each coalescer and the wall;
   a first baffle positioned adjacent to the proximal end of each coalescer and extending between the coalescers to close the central path; and
   a second baffle comprising a first baffle portion and a second baffle portion, each of the baffle portions being positioned adjacent to the distal end of a coalescer and extending from the coalescer to the wall such that the corresponding side path is blocked;
   wherein the tank is configured such that the first baffle and the second baffle cause wastewater to flow past one of the baffles, through the coalescers, and past the second baffle as the wastewater flows between the first closed end and the second closed end of the tank.

2. The tank of claim 1, wherein the coalescers are vertical tube coalescers.

3. The tank of claim 2, further comprising a second wall surrounding the first wall and forming an annular space between the first and second walls.

4. The tank of claim 3, wherein the walls are comprised of plastic.

5. The tank of claim 4, wherein the plastic is fiber reinforced.

6. The wastewater storage tank of claim 1, wherein the coalescers are adapted to remove oil from the wastewater.

7. The wastewater storage tank of claim 1, wherein the coalescers comprise an oleophilic material.

8. A vessel comprising:
   a cylindrical wall having a first diameter;
   a cylindrical coalescer having a second diameter and a proximal end and a distal end, the second diameter being smaller than the first diameter, the coalescer being positioned inside the cylindrical wall such that an exterior path between the wall and the coalescer is formed, the coalescer having an interior path formed therethrough, the interior path being approximately parallel to a longitudinal axis of the coalescer;
   a first baffle, the first baffle being positioned adjacent to the proximal end of the coalescer and sized to close the interior path; and
   a second baffle having a third diameter approximately equal to the first diameter and having a hole formed therein corresponding in size and shape to the interior path, the second baffle being positioned adjacent to the distal end of the coalescer;
   wherein the vessel is configured such that wastewater is forced to flow past the first baffle, along the exterior path, through the coalescer, along the interior path and past the second baffle.

9. The vessel of claim 8, further comprising a first end wall attached to a first end of the cylindrical wall and a second end wall attached to a second end of the cylindrical wall, the cylindrical wall, first end wall and second end wall forming an enclosed storage area for the storage of wastewater.

10. The vessel of claim 9, wherein the cylindrical wall, the first end wall and the second end wall are comprised of plastic.

11. The vessel of claim 8, wherein the coalescers are vertical tube coalescers.

* * * * *